US008903905B2

United States Patent
Cadou et al.

(10) Patent No.: US 8,903,905 B2
(45) Date of Patent: Dec. 2, 2014

(54) METHOD AND SYSTEM FOR AUTOMATICALLY STORING A COMMUNICATION SESSION

(75) Inventors: Olivier Cadou, Paris (FR); Médéric Le Broton, Bussy St. Georges (FR); Stéphane Prin, Houilles (FR); Vivien Dubrau, Paris (FR)

(73) Assignee: Cegedim Kadrige, Boulogne Billancourt (FR)

( * ) Notice: Subject to any disclaimer, the term of this patent is extended or adjusted under 35 U.S.C. 154(b) by 718 days.

(21) Appl. No.: 12/991,957

(22) PCT Filed: May 12, 2009

(86) PCT No.: PCT/FR2009/050869
§ 371 (c)(1),
(2), (4) Date: Jan. 17, 2011

(87) PCT Pub. No.: WO2009/014734
PCT Pub. Date: Dec. 10, 2009

(65) Prior Publication Data
US 2011/0131276 A1    Jun. 2, 2011

(30) Foreign Application Priority Data

May 13, 2008 (FR) .................................. 08 53075

(51) Int. Cl.
| G06F 15/16 | (2006.01) |
| H04L 29/06 | (2006.01) |
| H04L 12/18 | (2006.01) |
| H04M 3/42  | (2006.01) |
| H04M 3/56  | (2006.01) |
| H04M 7/00  | (2006.01) |

(52) U.S. Cl.
CPC ........ *H04L 65/1083* (2013.01); *H04L 12/1831* (2013.01); *H04M 3/42221* (2013.01); *H04M 3/567* (2013.01); *H04M 7/006* (2013.01); *H04M 2203/652* (2013.01)

USPC .......................................................... 709/204

(58) Field of Classification Search
CPC ........... H04L 12/1831; H04L 65/1083; H04M 3/42221; H04M 7/006; H04M 2203/652; H04M 3/567
USPC .......... 709/204, 205, 227, 228; 370/260, 261, 370/263, 264, 266, 270; 348/14.08, 14.09
See application file for complete search history.

(56) References Cited

U.S. PATENT DOCUMENTS 5,559,875 A * 9/1996 Bieselin et al. .......... 379/202.01
6,025,870 A * 2/2000 Hardy .......................... 348/14.1

(Continued)

FOREIGN PATENT DOCUMENTS

| JP | 59023689 A * | 2/1984 | ............... H04N 7/18 |
| JP | 04051690 A * | 2/1992 | ............... H04N 7/15 |

(Continued)

OTHER PUBLICATIONS

Tschirgi J.E. et al; "Speech Technology and Applications in the Intelligent Network"; Discovering a New World of Communications; Chicago, Jun. 14, 1992; p. 71-75.

*Primary Examiner* — Kostas Katsikis
(74) *Attorney, Agent, or Firm* — Harness, Dickey & Pierce, PLC

(57) ABSTRACT

Disclosed is a method for recording a communication session initiated by at least one communication terminal with at least one second communication terminal, utilizing at least one communication channel established via a computer and/or telephone network, from at least one recording server, a request to record the communication session, including recording configuration data, enabling, in particular, the identification of each communication channel, connecting the recording server to each communication channel established during initiation of the communication session according to the configuration data received, and recording data transferred over each communication channel by the recording server.

11 Claims, 1 Drawing Sheet

(56) References Cited

U.S. PATENT DOCUMENTS

| | | | |
|---|---|---|---|
| 6,259,701 B1* | 7/2001 | Shur et al. | 370/401 |
| 7,466,334 B1* | 12/2008 | Baba | 348/14.06 |
| 7,590,230 B1* | 9/2009 | Surazski | 379/202.01 |
| 8,379,821 B1* | 2/2013 | Ramage et al. | 379/202.01 |
| 8,456,507 B1* | 6/2013 | Mallappa et al. | 348/14.08 |
| 8,675,853 B1* | 3/2014 | Guilfoyle | 379/202.01 |
| 2003/0023683 A1* | 1/2003 | Brown et al. | 709/204 |
| 2003/0169330 A1* | 9/2003 | Ben-Shachar et al. | 348/14.09 |
| 2003/0174826 A1* | 9/2003 | Hesse | 379/210.01 |
| 2004/0203677 A1 | 10/2004 | Brown et al. | |
| 2004/0207724 A1* | 10/2004 | Crouch et al. | 348/14.09 |
| 2005/0128283 A1* | 6/2005 | Bulriss et al. | 348/14.1 |
| 2005/0210105 A1* | 9/2005 | Hirata et al. | 709/205 |
| 2005/0240656 A1* | 10/2005 | Blair | 709/213 |
| 2005/0248651 A1* | 11/2005 | Hirata et al. | 348/14.08 |
| 2005/0275715 A1* | 12/2005 | Shingu et al. | 348/14.07 |
| 2007/0040901 A1* | 2/2007 | Yamazaki | 348/14.08 |
| 2007/0040902 A1* | 2/2007 | Wakai | 348/14.08 |
| 2007/0041666 A1* | 2/2007 | Nagamine et al. | 382/305 |
| 2007/0206581 A1* | 9/2007 | Nam | 370/356 |
| 2007/0288569 A1* | 12/2007 | Yuan et al. | 709/204 |
| 2007/0297577 A1* | 12/2007 | Wyss | 379/67.1 |
| 2008/0120371 A1* | 5/2008 | Gopal | 709/204 |
| 2010/0002066 A1* | 1/2010 | Nelson | 348/14.1 |
| 2013/0129057 A1* | 5/2013 | Ramage et al. | 379/67.1 |
| 2014/0033133 A1* | 1/2014 | Pegg | 715/863 |

FOREIGN PATENT DOCUMENTS

| | | | | |
|---|---|---|---|---|
| JP | 08335097 A | * | 12/1996 | G10L 9/18 |
| JP | 2002251393 A | * | 9/2002 | G06F 17/30 |
| WO | 97/41678 A | | 11/1997 | |
| WO | WO 2006032590 A1 | * | 3/2006 | |

* cited by examiner

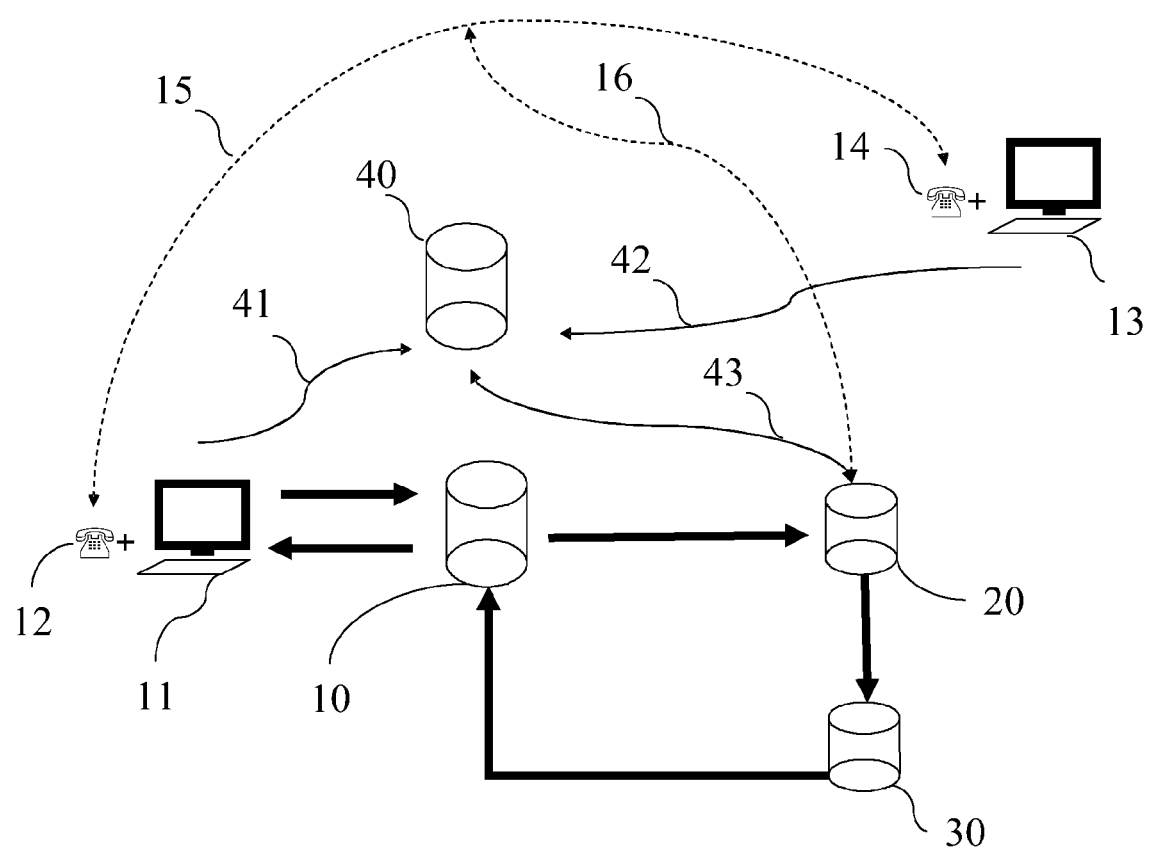

METHOD AND SYSTEM FOR AUTOMATICALLY STORING A COMMUNICATION SESSION

CROSS-REFERENCE TO RELATED APPLICATIONS

This application is a National Stage of International Application No. PCT/FR2009/050869, filed May 12, 2009. The entire disclosure of the above application is incorporated herein by reference.

BACKGROUND

1. Technical Field of the Invention

This invention relates in general to the field of telecommunications and relates more specifically to a method and a system for recording a communication session initiated by at least one communication terminal with at least one second communication terminal, by means of at least one communication channel established via a computer and/or telephone network.

2. Description of Related Art

It is known to establish connections between professional partners by means of telephone conference systems, or via videoconference systems implemented on specific network infrastructures, based, for example, on the RNIS standard.

Many Web conference services have also been developed, providing simple and effective means for enriching work sessions.

These services, in which the users, each using a computer, or a mobile terminal, equipped with ad hoc resources (typically a navigator and an Internet connection), communicate with one another, in real time, using Internet communication protocols, are indeed particularly suitable for holding virtual meetings between remote users.

A Web conference service thus makes it possible to respond in a simple manner to document sharing means, in contexts in which the users have a need to meet in order to see a presentation or information.

In addition to this functionality of sharing applications or files of any type, Web conference services can also provide audio, video or instant messaging flow management functionalities.

The various telecommunication solutions described above, which can also be implemented in combination, therefore provide an entire range of functionalities, enabling virtual meetings or virtual training sessions with remote people to be held.

In this context, there is a need for a solution making it possible to simply and transparently record any remote communication session implemented between at least users, regardless of the communication mode on which it is based: telephone, Web, audio or video, implemented in combination or not.

BRIEF SUMMARY

The invention is intended to respond to this need. This objective is achieved by providing a method, consistent with the general definition provided in the preamble above, and, more specifically, characterized in that it includes steps of:

receiving, by at least one recording server, a request to record the communication session, including recording configuration data, enabling in particular the identification of each communication channel, connecting the recording server to each communication channel established during initiation of the communication session, according to the configuration data received, recording data transferred over each communication channel by the recording server.

According to an embodiment, the communication session includes a Web conference, in which a communication channel is established between a server housing a Web conference application and, respectively, each communication terminal participating in the Web conference, in which the connection and recording steps performed by the recording server consist, for the latter, of:

connecting to the server housing the Web conference application, running the application as an additional participant at said conference, recording said application.

Preferably, each communication channel established between the server housing the Web conference application and each communication terminal participating in said conference includes a data connection and/or an audio connection and/or a video connection and/or an instant messaging connection.

Advantageously, the recording configuration data received by the recording server includes a URL address identifying the Web conference application and a code for accessing said conference.

According to another embodiment, which may or may not be taken in combination with the previous one, the communication session includes telephone communication.

Preferably, each communication channel supporting the telephone communication is established via a public switched telephone network or a mobile telephone network.

Alternatively, each communication channel supporting the telephone communication includes a connection suitable for establishing voice-over-IP connections, supporting an IP telephone application.

Preferably, the recording server is connected to the telephone communication as an additional participant in said communication and performs the recording thereof.

Advantageously, the recording configuration data received by the recording server includes telephone contact information enabling the server to be connected with the communication channel.

Preferably, the method according to the invention includes a preliminary step of registration with a recording service, in which a user connects to a computer server in order to be identified by the service and, in return, receives data for personalized access to the service.

Advantageously, the method according to the invention includes the following steps:

the user accesses the recording service by means of personalized access data, the user programs the request to record the communication session before it is transmitted to the recording server, the validity of said request is verified before it is transmitted to the recording server.

Advantageously, the programming step includes the determination of a data and a time at which the recording is started.

Preferably, the method according to the invention includes a step of transferring recorded data from the recording server to a data conversion server, suitable for performing an operation of compression of the recorded data in a predetermined format.

Preferably, the method according to the invention includes a step of providing data recorded on at least one storage and consultation server.

The invention also relates to a server for recording a communication session initiated by at least one first communication terminal with at least one second communication terminal by means of at least one communication channel established via a computer and/or telephone network, characterized in that it includes:

- means for receiving a request to record the communication session,
- means for connecting to each communication channel established, according to recording configuration data received with said recording request, making it possible in particular to identify each communication channel, and
- means for recording data transferred over each communication channel.

According to an embodiment, the connection means include means for connecting to a server housing a Web conference application in which the communication terminals participate and means for running the application as an additional participant in said conference.

According to another embodiment, which can be taken in combination or not with the previous one, the server includes connection means with a telephone communication between the communication terminals.

The invention also relates to a system for recording a communication session initiated by at least one first communication terminal with at least one second communication terminal by means of at least one communication channel established via a computer and/or telephone network, characterized in that it includes:

- at least one recording server according to the invention,
- at least one data conversion server, including means for receiving data recorded by said recording server and means for compressing said data recorded in a predetermined format,
- at least one data storage and consultation server, including means for receiving recorded data, compressed or not, and means for storing said data and making it available.

BRIEF DESCRIPTION OF THE DRAWING

Other features and advantages of this invention will become clearer on reading the following description provided for illustrative and non-limiting purposes, with reference to the appended drawing in which:

FIG. 1 is a functional diagram of the system according to the present invention.

DETAILED DESCRIPTION OF THE INVENTION

The system for recording a communication session initiated by at least one first communication terminal with at least one second communication terminal by means of at least one communication channel established via a computer and/or telephone network will be described in the context of a communication session based on a Web conference combined with a telephone communication. However, it is clear that the system is applicable to all types of communication sessions that can be established, including a telephone communication or conference, a Web conference, combined or not with a telephone conference, combined or not with an audio or video conference.

The recording system described in FIG. 1 includes a computer server 10, intended to receive the registration requests of users seeking to use the recording service. Indeed, any user seeking to obtain automatic recordings of communication sessions with other remote users must, in a preliminary step, be registered and identified in order to obtain, in return, data for personalized access to the service.

The computer server 10 includes, for example, a Web server housing an Internet site to which the user connects, via, for example, his or her personal computer, in order to provide identification information using, for example, an identification form to be completed. The identification data provided by the user includes, for example, his or her personal contact information (surname, first name, address, etc.), as well as communication session recording configuration data, which will subsequently be used for session recordings. This configuration data includes, for example, telephone contact information (such as a telephone conference number, a stationary telephone number, a mobile telephone number) and/or Web contact information (such as a URL address and codes for accessing a Web conference application).

In this way, the user can record a plurality of possible recording configurations, from which he or she may choose in a subsequent recording request.

After this preliminary step of registering with the recording service, the server 10 sends, in return to the user, data for personalized access to the service, including, for example, a user code (login) associated with a password, whereby the user can access his or her personal account on the site, enabling various functionalities offered by the recording service to be used, and which will be described in greater detail below.

Alternatively, the access by the user to the various functionalities and, in particular, the functionality making it possible to request the start of a recording of a communication session, may also be enabled by sending an SMS (short message service), an email or by calling a voice server. In this case, after the registration step, the user also receives the information necessary for accessing the service by these means, such as the special number for sending an SMS, the voice server number and the electronic messaging address.

Thus, an identified user having service access rights can program a request to record a communication session, by means of a Web form available for this purpose on the accessed Internet site intended for registration, by means of an SMS, by means of a message on a voice server, or by means of an email.

To do this, according to the example of FIG. 1, the user connects by means of a personal computer-type communication terminal 11 to the server 10, in order to access his or her personal account using access data received during registration, and programs the chosen recording configuration data, by indicating the type of communication session that he or she wants to record (telephone, Web or both, according to the example) and the chosen contact information.

According to the example of FIG. 1, the communication session between the user communication terminals 11, 12 and 13, 14, respectively, includes a Web conference combined with a telephone communication.

Thus, concerning the Web conference, a communication channel should be established between a server 40 housing a Web conference application and, respectively, each communication terminal 11 and 13, of the personal computer type, for example, participating in the Web conference, in which each of these channels 41, 42 can include a data connection and/or an audio connection and/or a video connection and/or an instant messaging connection.

In the context of the telephone communication between the communication terminals 12 and 14, a communication channel 15 supporting the latter can, for example, be established via a switched public telephone network or a mobile telephone network. Alternatively, the communication channel can include a connection suitable for the establishment of voice-over-IP connections, supporting an IP telephone application.

The request to record such a communication session therefore consists of a request to record the telephone communication as well as a request to record the Web conference, and the recording configuration data programmed by the user in the request must make it possible to precisely identify each communication channel to be established at the time of this communication session.

The recording configuration data therefore includes, in this example, a URL address identifying the Web conference application and an access code for said conference, as well as the telephone contact information necessary for establishing the telephone communication.

The request to record the communication session thus programmed by the user is then transmitted to the server 10.

The programming of recording configuration data can also consist of determining, in the request, a date and a time to start the recording, in which the latter can in this way be programmed in advance.

When the server 10 receives the recording request, it first verifies the validity of the identity of the user and the request. If the request is not valid, the server sends a signal to the user's computer indicating that the recording cannot be performed, accompanied by corresponding patterns.

The system according to the invention also includes at least one recording server 20, suitable for processing communication session recording requests. To prepare the recording, the verification of the availability of a recording server is first performed.

If the recording request is valid, and if a recording server 20 is available, then the request is transmitted to the latter in order to prepare for the recording requested by the user.

The recording server 20 according to the invention therefore includes means for receiving the request to record the communication session, means for connecting to each communication channel identified according to the recording configuration data included in the request, and means for recording data transferred on each communication channel when the session is established.

More specifically, concerning the recording of the Web conference, when it is started, the recording server 20 connects by the connection 43 to the server 40 housing the Web conference application selected by the user, in which the communication terminals 11 and 13 participate, and runs the application as an additional participant in said conference, which therefore becomes a three-way conference in the example, owing to the configuration data received. The recording server takes into account the various access codes or conference participant codes. The application is highlighted in order to be recorded.

In an alternative in which the Web conference application used is not simply accessible via a URL and an access code, it is possible to envisage installing the Web conference application on the recording server and to allow the user to choose the Web conference application to be used. The recording server then takes on the task, when it receives the recording request, of connecting the participants by launching the necessary applications with the appropriate access codes.

Concerning the recording of the telephone communication, the recording server 20 connects by the connection 16 to the telephone communication between terminals 12 and 14 as an additional participant in said communication, which therefore becomes a three-way communication in the example, and performs the recording, owing to the recording configuration data received, which includes the telephone contact information enabling the server 20 to be connected to the communication channel 15.

According to the example in which the telephone communication is implemented by means of IP telephone software supported by a voice-over-IP connection on the channel 15, the recording server runs the IP telephone software selected by the user. The number dialed by the server is that selected by the user. The recording server takes into account the various access codes or participant codes if it is a telephone conference.

It should therefore be noted that, in order for the telephone communication to be capable of being recorded, the user must have a stationary or mobile telephone enabling telephone conferences, or indicate the contact information of a telephone conference organized by an operator.

If the user does not have a telephone enabling a teleconference to be implemented, he or she may indicate it on the identification form. When he or she calls the recording service, it will be necessary to specify the telephone (or telephone conference) number of his or her contact(s) and it is then the recording server that puts itself in teleconference mode and calls both the user and the contact or the user and the telephone conference in order to establish the communication therebetween.

The basic principle of the invention is therefore to add a participant to any communication established in the context of the communication session to be recorded, in which said additional participant is constituted by the recording server 20. This server is then intended to connect to each communication channel established during the communication session, like any other participant in the communication session, and also to perform the recording thereof.

When the user wants to stop, return to or end the recording of the communication session, he or she may send a message to the recording service, by means of his or her Internet account, by an SMS or an email, or by interrupting the Web or telephone communication.

Once the recording has been completed, a step of transferring the recorded data is implemented, in which the recording server 20 transfers the recording to a data conversion server 30 of the system according to the invention.

The data conversion server 30 is then suitable for performing an operation of compression of the recorded data into a predetermined format. This data compression format can be selected by the user from a plurality of formats available, during programming of the request.

Finally, once converted, the recorded data is intended to be transmitted to final destinations, constituted by storage and consultation servers, for example the Webs server 10 used for registration, or a voice or video server, so as to be made available to the user.

The additional examples below show a practical implementation of the method of the invention in very common situations.

Example 1

Recording of a Telephone Conversation

According to a possible embodiment, the method is implemented by using a telephone enabling a three-way conference, for example a telephone of the type commercially available under the trade names "iPhone®" or "BLACKBERRY®".

In this embodiment, a person X is called by the recording server. Upon receiving the call, the person makes a new call with his or her own telephone and joins the two communications. In this case, the server is not used in conference mode.

Example 2

Recording of a Telephone Conversation

According to another possible embodiment, the method is implemented by using a server in conference mode.

In this embodiment, a person X can record an outgoing call from any telephone (stationary or mobile) regardless of the owner (so that a telephone can be borrowed in order to make a recording).

To do this, said person dials the number of the recording server and enters his or her access code, as well as the number of the person Y that he or she wants to call. The recording server makes a new call to Y, joins the two communications, and records.

In this case, the number of the person Y can also be the number of a teleconference. The person X can then participate as can the recording server, while recording it.

In this example, as in the previous example, the recordings are automatically made available in converted and compressed digital form (for downloading, sending by electronic messaging, sending by telephone or listening over the Internet).

Example 3

Recording Incoming Calls

A person X, who has a telephone with a calling number A, provides a calling number B to his or her contacts.

The calling number B reaches the recording server (the recording server can indeed be equipped with telephone chips as in mobile telephones, thereby enabling it to have calling numbers of the same type) which recognizes it, automatically generates a teleconference with the calling number A, and records it.

In this specific case, it is, for example, possible to give a person X a mobile telephone with a calling number A, in which said mobile telephone is configured so as not to transmit or display its number. Although the calling number of person X is A, the calling number known to person X is B. In fact, B, i.e. the number that person X gives to his or her contacts and has printed on business cards, is the calling number of the recording server, which, when it receives a call, automatically switches to conference mode and calls number A. Thus, all incoming calls on the telephone of person X are recorded.

As an option, person X can, if desired, decide to record all incoming calls or to select in advance the contacts that her or she wishes to record by indicating their calling numbers, so that the recording server can recognize them.

Example 4

Recording of a Web Session

In a possible embodiment, the server connects as a participant in the Web session and records its own screen in video format.

In this case, however, the simultaneous recording of a plurality of Web conferences requires as many recording servers or the simulation of virtual machines by the server(s).

Example 5

Recording of a Web Session

In another possible embodiment, the recording server has access to the conference server that has stored all of the minuted events and actions (content presented, movement of the mouse, messages exchanged, etc.) performed by the conference holder and the participants. This information makes it possible to replay the Web session (only the video in real time cannot be replayed) and synchronized with the audio recording (telephone or IP, etc.).

Although this second embodiment is dependent on the Web conference system used and cannot record the video in real time, it nevertheless has the advantage of enabling an unlimited number of simultaneous Web session recordings without requiring the use of a plurality of servers or virtual machines.

The system for remote automatic recording of a communication session described above is particularly advantageous since it does not require any installation or downloading of any additional program on the communication terminal of the user.

The invention claimed is:

1. A method for recording a communication session initiated by at least one communication terminal with at least one second communication terminal, by means of at least one communication channel established via a computer and/or telephone network, which method includes the steps of:
  receiving, by at least one recording server, a request to record the communication session, including recording configuration data, enabling in particular the identification of each communication channel,
  connecting the recording server to each communication channel established during initiation of the communication session, according to the configuration data received,
  adding said recording server to any communication established in the context of the communication session to be recorded, in which said recording server is connected to each communication channel established during initiation of the communication session, like any other participant in the communication session, according to the configuration data received, and
  recording data transferred over each communication channel by the recording server, wherein the recording server is configured to put itself in teleconference mode and calls the communication terminals in order to establish the communication therebetween, and wherein the communication session includes a Web conference, in which a communication channel is established between a server housing a Web conference application and, respectively, each communication terminal participating in the Web conference, in which the connection and recording steps performed by the recording server consist, for the latter, of:
  connecting to the server housing the Web conference application,
  running the application as an additional participant at said conference, and
  recording said application.

2. The method according to claim 1, further including a step of providing data recorded on at least one storage and consultation server.

3. The method according to claim 1, wherein each communication channel established between the server housing the Web conference application and, respectively, each communication terminal participating in the Web conference, includes a data connection and/or an audio connection and/or a video connection and/or an instant messaging connection;

the recording configuration data received by the recording server including a URL address identifying the Web conference application and a code for accessing said conference.

4. The method according to claim 1, further including a step of transferring recorded data from the recording server to a data conversion server, suitable for performing an operation of compression of the recorded data in a predetermined format.

5. The method according to claim 1, wherein the communication session includes a telephone communication, each communication channel supporting the telephone communication being established via a public switched telephone network or a mobile telephone network, or wherein each communication channel supporting the telephone communication includes a connection suitable for establishing voice-over-IP connections, supporting an IP telephone application.

6. The method according to claim 5, wherein the recording configuration data received by the recording server includes telephone contact information enabling the server to be connected with the communication channel.

7. The method according to claim 1, further including a preliminary step of registration with a recording service, in which a user connects to a computer server in order to be identified by the service and, in return, receives data for personalized access to the service.

8. The method according to claim 7, further including the following steps:

the user accesses the recording service by means of personalized access data, the user programs the request to record the communication session before it is transmitted to the recording server, the validity of said request is verified before it is transmitted to the recording server; and the programming step including the determination of a data and a time at which the recording is started.

9. A recording server for recording a communication session initiated by at least one first communication terminal with at least one second communication terminal by means of at least one communication channel established via a computer and/or telephone network, said server includes:

a receiver for receiving a request to record the communication session, a connector for connecting to each communication channel established during initiation of the communication session, like any other participant in the communication session, according to recording configuration data received with said recording request, making it possible in particular to identify each communication channel, and a recorder for recording data transferred over each communication channel, wherein the recording server is configured to call the at least one first communication terminal and the at least one second communication terminal in order to establish a teleconference therebetween, and wherein the communication session includes a Web conference and the connector is capable of connecting to a server housing a Web conference application in which the communication terminals participate and is capable of running the application as an additional participant in said conference, and recording said application.

10. The recording server according to claim 9, further including a connector connected with a telephone communication line between the communication terminals.

11. A system for recording a communication session initiated by at least one first communication terminal with at least one second communication terminal by means of at least one communication channel established via a computer and/or telephone network, including:

at least one recording server according to claim 9, at least one data conversion server, including a receiver for receiving data recorded by said recording server and a compressor for compressing said data recorded in a predetermined format, at least one data storage and consultation server, including a receiver for receiving recorded data, compressed or not, and a memory for storing said data and making it available.

* * * * *

UNITED STATES PATENT AND TRADEMARK OFFICE
CERTIFICATE OF CORRECTION

PATENT NO.       : 8,903,905 B2                                  Page 1 of 1
APPLICATION NO.  : 12/991957
DATED            : December 2, 2014
INVENTOR(S)      : Olivier Cadou et al.

It is certified that error appears in the above-identified patent and that said Letters Patent is hereby corrected as shown below:

On the Title Page

(75) Inventors: "Médéric Le Broton" should be changed to -- Médéric Le Breton --

Signed and Sealed this
Twenty-ninth Day of September, 2015

Michelle K. Lee
*Director of the United States Patent and Trademark Office*